(12) United States Patent
Chen et al.

(10) Patent No.: US 11,714,215 B2
(45) Date of Patent: Aug. 1, 2023

(54) OPTICAL LENS, MOLD FOR OPTICAL LENS AND MANUFACTURING METHOD THEREOF

(71) Applicant: ORANGETEK CORPORATION, Changhua County (TW)

(72) Inventors: Chun-Chieh Chen, Changhua County (TW); Chia-Jung Chang, Changhua County (TW); Chih-Yi Huang, Changhua County (TW); Chun-Yi Yeh, Changhua County (TW)

(73) Assignee: ORANGETEK CORPORATION, Changhua County (TW)

( * ) Notice: Subject to any disclaimer, the term of this patent is extended or adjusted under 35 U.S.C. 154(b) by 407 days.

(21) Appl. No.: 17/025,739

(22) Filed: Sep. 18, 2020

(65) Prior Publication Data
US 2022/0091305 A1    Mar. 24, 2022

(51) Int. Cl.
*G02B 3/08* (2006.01)
*B29D 11/00* (2006.01)
*B29C 33/38* (2006.01)

(52) U.S. Cl.
CPC ............ *G02B 3/08* (2013.01); *B29C 33/3842* (2013.01); *B29D 11/0048* (2013.01); *B29D 11/00269* (2013.01)

(58) Field of Classification Search
CPC .... B23K 2103/04; B23K 26/38; B23K 26/40; B29C 33/3842; B29D 11/00269; B29D 11/0048; B29D 11/00692; C22C 38/002; C22C 38/02; C22C 38/04; C22C 38/18; C22C 38/42; C22C 38/60; G02B 3/08
See application file for complete search history.

(56) References Cited

U.S. PATENT DOCUMENTS

| | | | | |
|---|---|---|---|---|
| 5,262,889 | A * | 11/1993 | Fink | G02B 26/002 372/99 |
| 6,525,699 | B1 * | 2/2003 | Suyama | H04N 13/366 348/E13.032 |
| 7,940,483 | B2 * | 5/2011 | Huang | G02B 7/08 359/825 |
| 2003/0067421 | A1 * | 4/2003 | Sullivan | H04N 13/388 348/E13.058 |

* cited by examiner

*Primary Examiner* — Joseph P Martinez
*Assistant Examiner* — Vipin Patel
(74) *Attorney, Agent, or Firm* — Muncy, Geissler, Olds & Lowe, P.C.

(57) ABSTRACT

An optical lens, mold for optical lens and manufacturing method thereof are provided, wherein the optical lens includes a spiral surface spiraling around an axial direction and an intermediate structure around which the spiral surface spirals, the intermediate structure extends axially relative to a side of the spiral surface, and two ends of the spiral surface defines a stepped difference. The structure of the mold and the optical lens are correspondingly complementary. The manufacturing method of the mold includes following steps of: providing a base, the base including a processing surface; processing the processing surface to form the spiral surface, the intermediate structure and the stepped difference of the mold.

19 Claims, 8 Drawing Sheets

OPTICAL LENS, MOLD FOR OPTICAL LENS AND MANUFACTURING METHOD THEREOF

BACKGROUND OF THE INVENTION

Field of the Invention

The present invention relates to an optical lens, mold for optical lens and manufacturing method thereof.

Description of the Prior Art

Optical fiber communication has the advantages of good transmission efficiency, resistance to electromagnetic interference and high stability. Optical fiber can be classified into single-mode fiber and multi-mode fiber according to the transmission method. The diametric dimension of the multi-mode fiber is much larger than the wavelength of the light beam so that light beams with different wavelengths and phase differences can be transmitted with their continuous reflection on the inner surface of the optical fiber. After long-distance transmission, differences due to the transmission speed between the light beams will occur, which causes the problem of modal dispersion and excessive luminous flux in the center of the optical fiber, which limits the transmission distance.

In order to solve the aforementioned problems, a vortex phase plate is generally used to convert the light beam into a vortex beam to prevent the light intensity from being concentrated at the central part of the optical fiber. However, the vortex phase plate is not easy to manufacture, and the conventional optical communication module requires a plurality of optical elements to establish the required path of light transmission. Any slight deviation of the position of each optical element can greatly affects the path of light transmission, which is difficult to make each optical element be located in precise position, difficult to process, and poor in quality, resulting in poor transmission effect.

The present invention is, therefore, arisen to obviate or at least mitigate the above-mentioned disadvantages.

SUMMARY OF THE INVENTION

The main object of the present invention is to provide an optical lens, mold for optical lens and manufacturing method thereof, in which it is simple in structure and manufacturing process, the light beam can be evenly dispersed, it is precise in the processing, and it is advantageous to product miniaturization.

To achieve the above and other objects, an optical lens is provided, including: a spiral surface spiraling around an axial direction and an intermediate structure around which the spiral surface spirals, the intermediate structure extending axially relative to a side of the spiral surface, and two ends of the spiral surface defining a stepped difference.

To achieve the above and other objects, a mold for manufacturing the optical lens is provided, including: a spiral surface spiraling around an axial direction of the mold and an intermediate structure around which the spiral surface spirals, the intermediate structure of the mold extends axially relative to a side of the spiral surface of the mold, two ends of the spiral surface of the mold defining a stepped difference, profiles of the spiral surface, intermediate structure and stepped difference of the mold and profiles of the spiral surface, intermediate structure and stepped difference of the optical lens are correspondingly complementary, respectively.

To achieve the above and other objects, a method for manufacturing the mold is provided, including steps of: providing a base, the base including a processing surface; processing the processing surface to form the spiral surface, the intermediate structure and the stepped difference of the mold.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 5 for a preferable embodiment of the present invention. A mold 2 for manufacturing an optical lens is provided. The mold 2 includes a spiral surface 22 around an axial direction 21 of the mold 2 and an intermediate structure 23 around which the spiral surface 22 spirals. The intermediate structure 23 of the mold 2 extends axially relative to a side of the spiral surface 22, and two ends of the spiral surface 22 of the mold 2 define a stepped difference 24.

Figure 1:
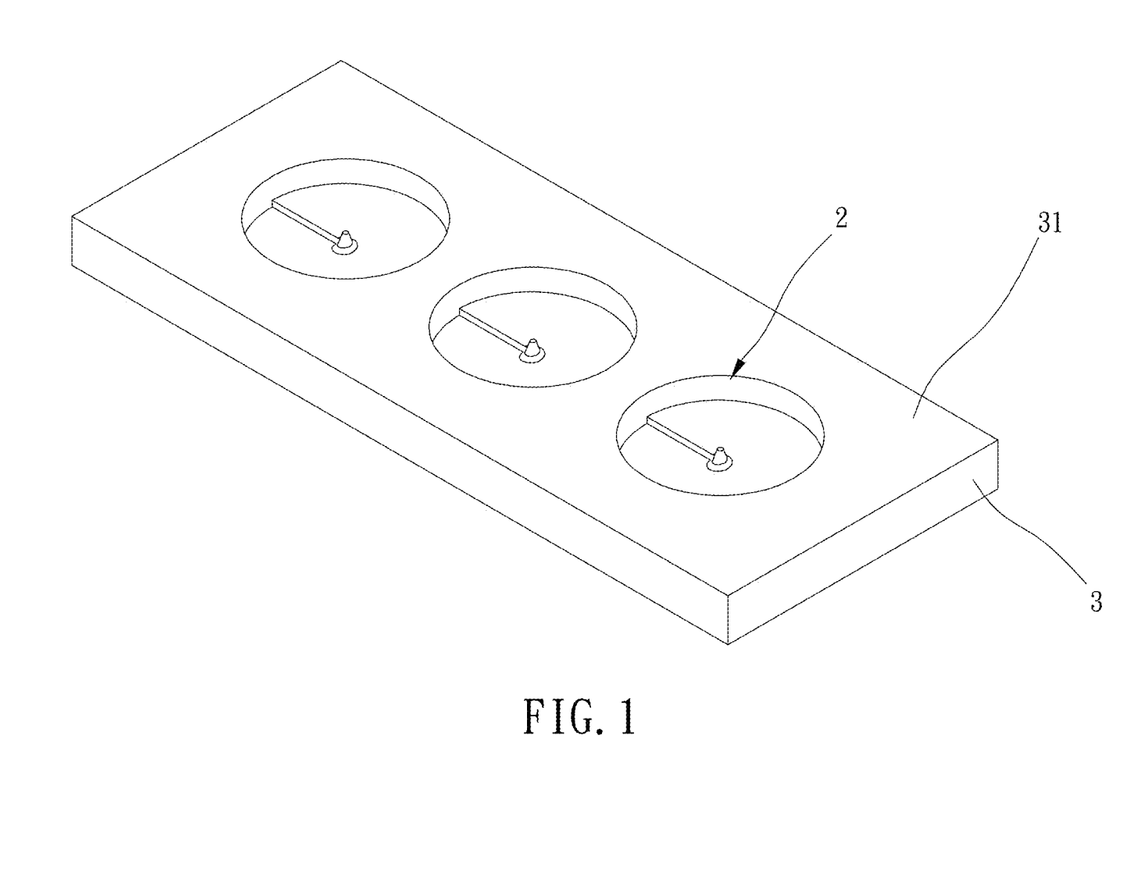
FIG. 1 is a stereogram of a mold according to a preferable embodiment of the present invention.
Figure 2:
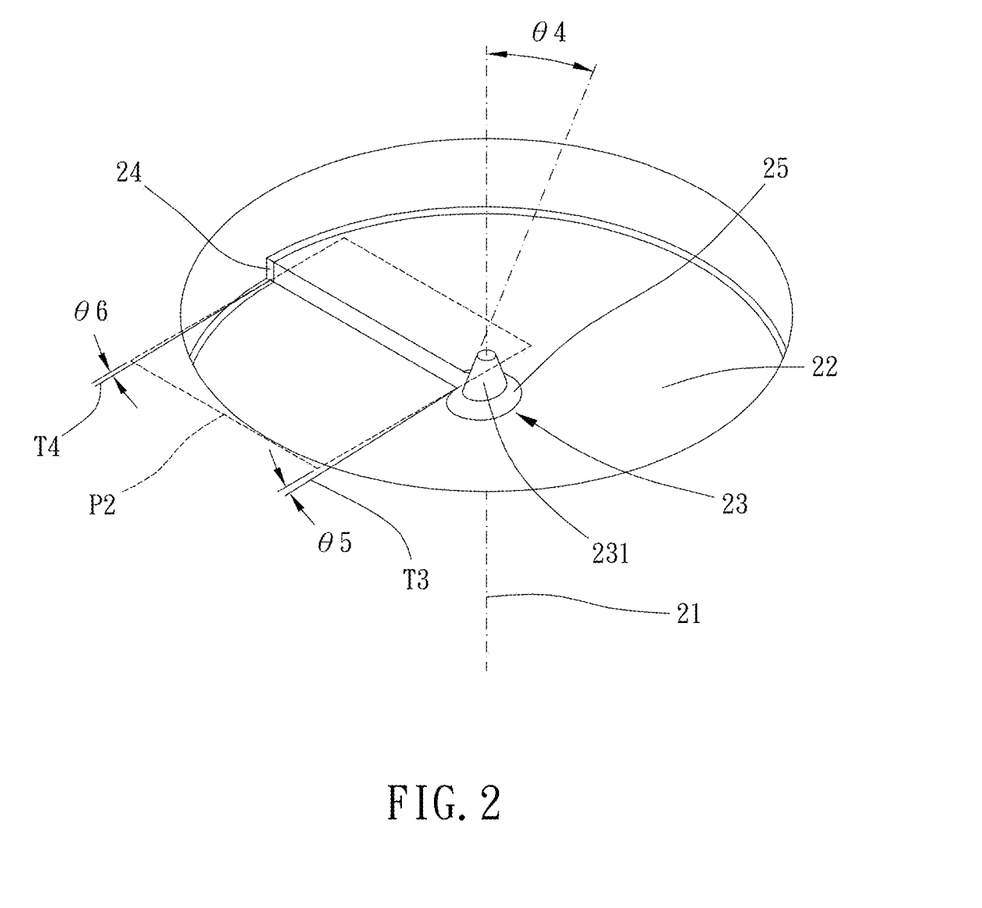
FIG. 2 is a partial enlargement of the mold according to a preferable embodiment of the present invention.

In this embodiment, the intermediate structure 23 of the mold 2 is a projection, an end face of the projection has a diametric dimension equal to or greater than 0.001 mm and equal to or smaller than 0.02 mm; an arcuate surface 25 is connected between the intermediate structure 23 of the mold 2 and spiral surface 22 of the mold 2, and the arcuate surface 25 of the mold 2 has an arc radius equal to or greater than 0.001 mm and equal to or smaller than 0.02 mm; the stepped difference 24 of the mold 2 is equal to or greater than 5 μm and equal to or smaller than 20 μm; the intermediate structure 23 of the mold 2 includes a circumferential wall 231, an included angle θ4 is defined between the circumferential wall 231 of the mold 2 and the axial direction 21 of the mold 2 and is equal to or greater than 1 degree and equal to or smaller than 20 degrees; a base plane P2 is defined as to be perpendicular to the axial direction 21 of the mold 2, the base plane P2 and a tangent direction T3 which is tangent to a peripheral edge of the arcuate surface 25 of the mold 2 define a first included angle θ5 therebetween, and the base plane P2 and a tangent direction T4 which is tangent to a peripheral edge of the spiral surface 22 of the mold 2 define a second included angle θ6 therebetween; the first included angle θ5 of the mold 2 is greater than the second included angle θ6 of the mold 2, the first included angle θ5 of the mold 2 is equal to or greater than 17.0 degrees, the second included angle θ6 of the mold 2 is equal to or greater than 0.70, wherein the first included angle θ5 is preferably about 17.2 degrees, and the second included angle θ6 is preferably about 0.72 degrees.

Figure 6:
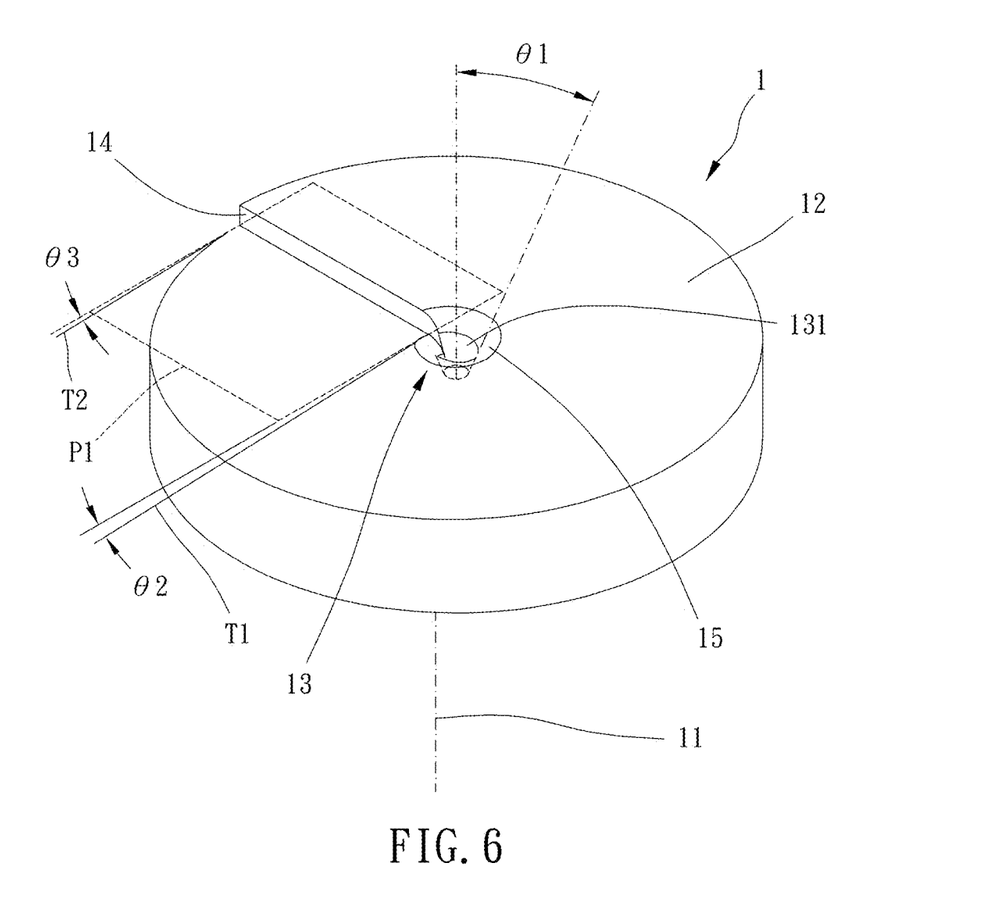
FIG. 6 is a drawing showing an optical lens according to a preferable embodiment of the present invention.
Figure 7:
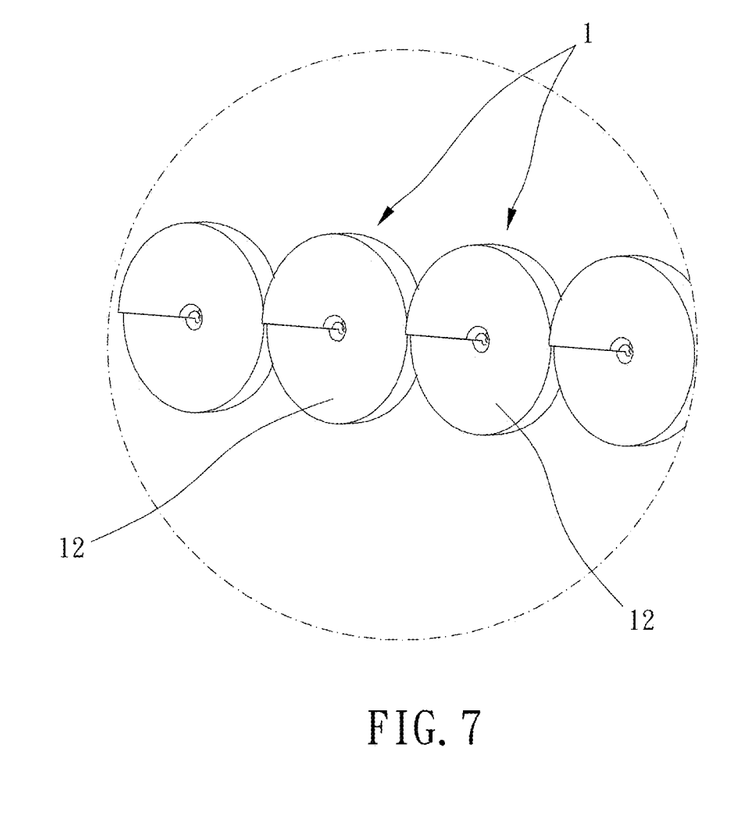
FIG. 7 is a partial enlargement of the optical lens according to a preferable embodiment of the present invention.

Please refer to FIGS. 6 to 7 for an optical lens 1 according to a preferable embodiment of the present invention. The optical lens 1 includes a spiral surface 12 spiraling around an axial direction 11 and an intermediate structure 13 around which the spiral surface 12 spirals. The intermediate structure 13 extends axially relative to a side of the spiral surface 12, and two ends of the spiral surface 12 define a stepped difference 14. Profiles of the spiral surface 22, intermediate structure 23 and stepped difference 24 of the mold 2 and profiles of the spiral surface 12, intermediate structure 13 and stepped difference 14 of the optical lens 1 are correspondingly complementary, respectively.

In this embodiment, the intermediate structure 13 is a recess (such as blind hole or through hole), and a diametric dimension of a bottom periphery of the recess is equal to or greater than 0.001 mm and equal to or smaller than 0.02 mm; an arcuate surface 15 is connected between the intermediate structure 13 and the spiral surface 12, and an arc radius of the arcuate surface 15 is equal to or greater than 0.001 mm and equal to or smaller than 0.02 mm; the stepped difference 14 is equal to or greater than 5 μm and equal to or smaller than 20 μm; the intermediate structure 13 includes a circumferential wall 131, an included angle θ1 is defined between the circumferential wall 131 and the axial direction 11 of the optical lens 1, and the included angle θ1 is equal to or greater than 1 degree and equal to or smaller than 20 degrees; a reference plane P1 is defined as to be perpendicular to the axial direction 11 of the optical lens 1, the reference plane P1 and a tangent direction T1 which is tangent to a peripheral edge of the arcuate surface 15 define a first included angle θ2 therebetween, the reference plane P1 and a tangent direction T2 which is tangent to a peripheral edge of the spiral surface 12 define a second included angle θ3, and the first included angle θ2 is greater than the second included angle θ3; the first included angle θ2 is equal to or greater than 17.0 degrees, and the second included angle θ3 is equal to or greater than 0.70 degrees, wherein the first included angle θ2 is preferably about 17.2 degrees, and the second included angle θ3 is preferably about 0.72 degrees.

In substance, the optical lens 1 and the mold 2 are structurally complementary. For example, the intermediate structure 13 of the optical lens 1 is a recess, and the intermediate structure 23 of the mold 2 is a projection; however, it is noted that if the intermediate structure 13 of the optical lens 1 is a projection, and the intermediate structure 23 of the mold 2 would be a recess.

Please refer to FIGS. 1 to 5 for a method for manufacturing the mold 2. The method for manufacturing the mold 2 includes following steps of: providing a base 3, wherein the base 3 includes a processing surface 31; processing the processing surface 31 to form the spiral surface 22, intermediate structure 23 and stepped difference 24 of the mold 2. According to various requirements or applications, the base 3 may be provided with a plurality of molding cavities, for producing a plurality of optical lens at once. Preferably, between every adjacent two of the plurality of molding cavities is a gap equal to or smaller than 0.01 mm so that respective vortex light beams form respective optical lenses do not interference with one another.

Figure 3:
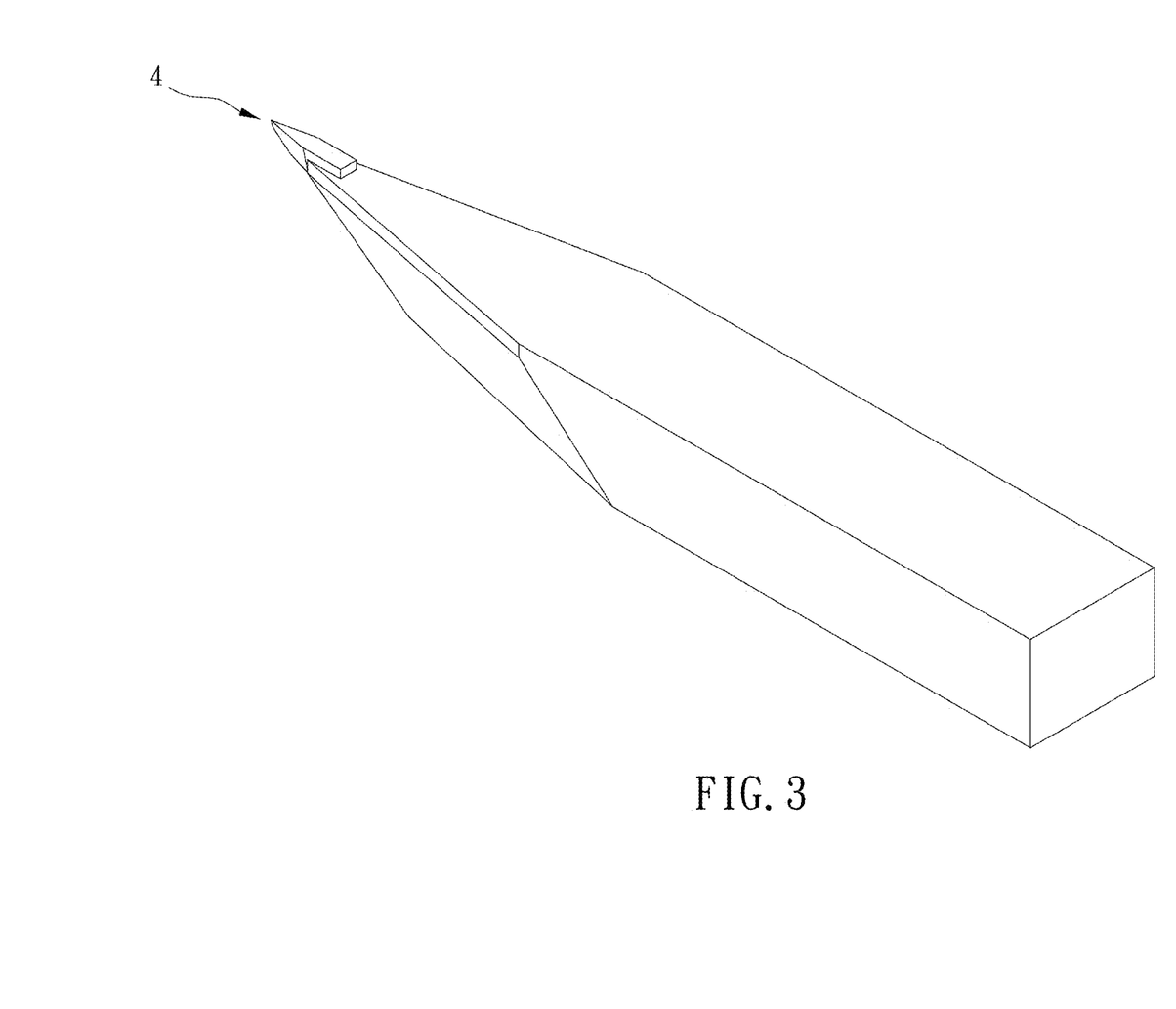
FIG. 3 is a drawing showing a cutter according to a preferable embodiment of the present invention.
Figure 4:
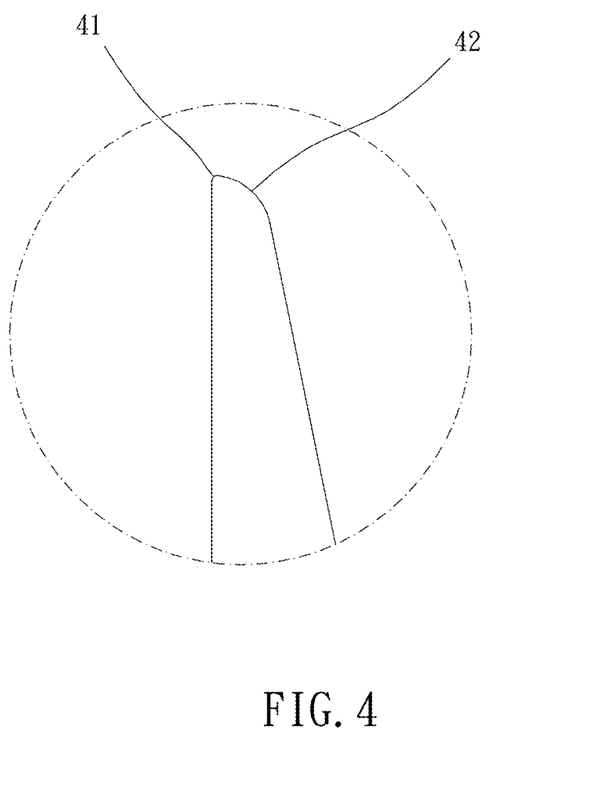
FIG. 4 is a partial enlargement of the cutter according to a preferable embodiment of the present invention.
Figure 5:
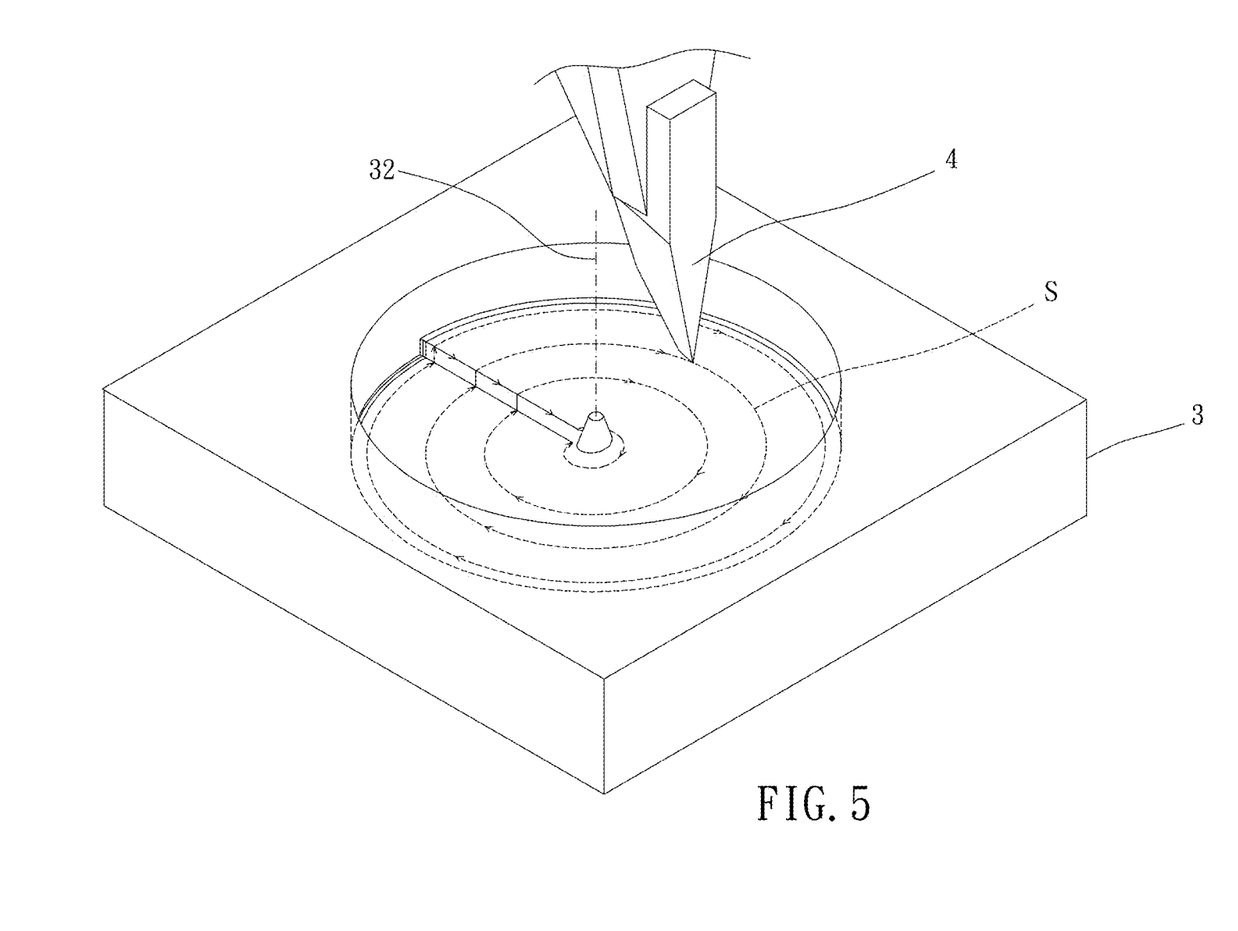
FIG. 5 is a drawing showing manufacturing of the mold according to a preferable embodiment of the present invention.

In this embodiment, a cutter 4 is used to process the processing surface 31 to form the spiral surface 22, intermediate structure 23 and stepped difference 24 of the mold 2. Relatively, cutting paths S of the cutter 4 on the base 3 is spirally around an axial direction 32 of the base 3. In processing, the cutter 4 may be fixed and the base 3 is rotated, or the base 3 may be fixed and the cutter 4 is rotated, or the cutter 4 and the base 3 may be cooperatively rotated at the same time as long as the processing surface 31 is processed along the cutting paths S. Specifically, each of cutting paths S extends from high to low relative to the processing surface 31, and extends upwardly at the stepped difference 24 of the mold 2 from low to high relative to the processing surface 31 of the base 3. The cutter 4 may processes the processing surface 31 from outside to inside (or from inside to outside) along the cutting paths S spirally around the axial direction 32 of the base 3. The cutter 4 has two opposite cutting edges having different arced angles 41, 42, and the processing surface 31 is processed by the cutter 4 in a manner that one of the two opposite cutting edges having a relatively smaller arced angle 41 faces radially inward. Preferably, one of the two opposite cutting edges 41, 42 has an arc radius equal to or smaller than 1 μm and greater than 1 μm, and the other of the two opposite cutting edges 41, 42 has an arc radius equal to or smaller than 5 μm.

It is noted that the scale factors of the above-mentioned elements are advantageous for producing evenly-distributed vortex light beam, and for applied to precise processing (using diamond cutter, for example) of the mold for manufacturing the optical lens, and thus the mold is easy to process, it is simple to draft the mold (because of the included angle). In an embodiment in which the diamond cutter is used to process the mold for manufacturing the optical lens, it is considered that there might be processing limits at a region in vicinity of the center of the mold, a cutting edge of the diamond cutter facing the center of the mold is configured to has a relatively smaller arc radius than an opposite cutting edge of the diamond cutter, which can minimize a natural arc radius, due to the arc radius of the cutting edge of the diamond cutter processing, to less than 1 μm. This is advantageous to processing precision and product miniaturization. The recess of the mold may be, for example, formed by laser, or any of suitable processing methods.

Figure 8:
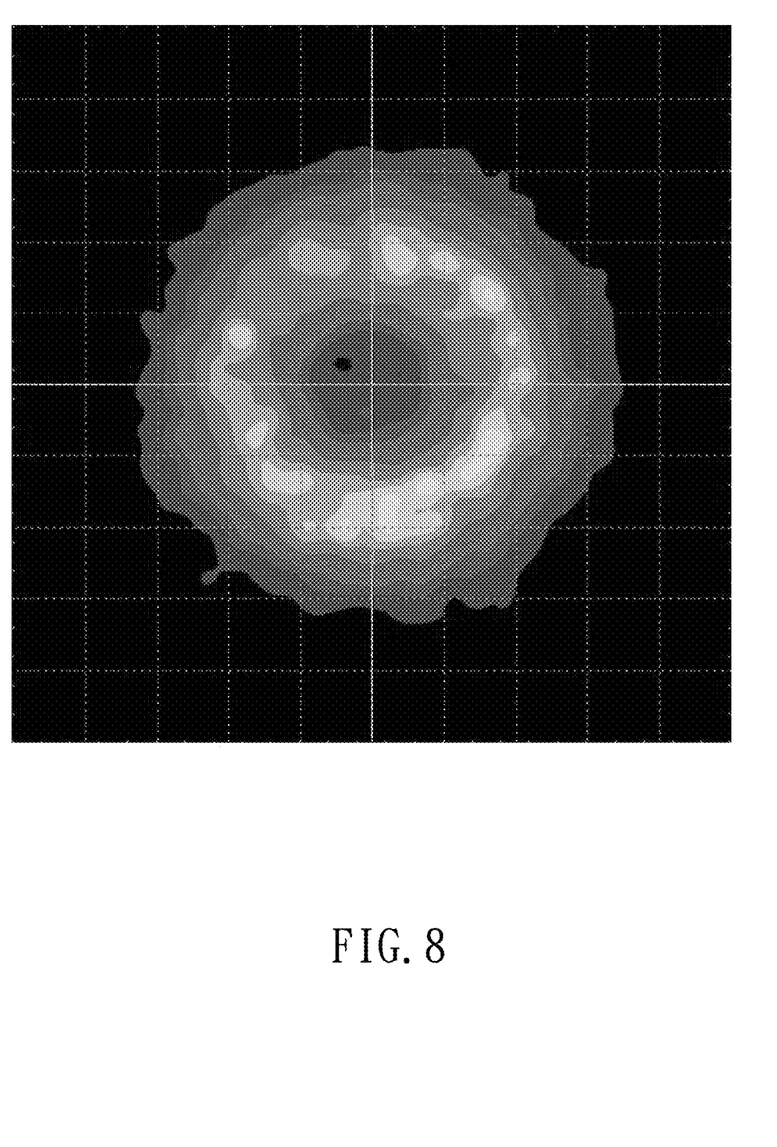
FIG. 8 is a drawing showing the light pattern formed by the optical lens according to a preferable embodiment of the present invention.

Please refer to FIG. 8 for light pattern formed by the optical lens according to a preferable embodiment of the present invention. It is shown that the light beam is evenly and spirally distributed in vortex due to the action of the spiral surface the optical lens; and the light beam is evenly distributed to be around the intermediate structure (such as a recess or projection) of the optical lens, which can prevent the light beam from concentrating in vicinity of the central portion of the lens and which can effectively solve problems of modal dispersion and over-concentrative luminous flux at the center of the optical fiber (these problems can lower transmission distance of the light beam). Through different combinations of the diametric dimension the optical lens, spiral angle of the spiral surface, size of the intermediate structure, size of the stepped difference, various optical effects can be obtained.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A optical lens, including: a spiral surface spiraling around an axial direction and an intermediate structure around which the spiral surface spirals, the intermediate structure extending axially relative to a side of the spiral surface, and two ends of the spiral surface defining a stepped difference;
wherein an arcuate surface is connected between the intermediate structure and the spiral surface, and an arc radius of the arcuate surface is equal to or greater than 0.001 mm and equal to or smaller than 0.02 mm.

2. The optical lens of claim 1, wherein the intermediate structure is a recess, a diametric dimension of a bottom periphery of the recess is equal to or greater than 0.001 mm and equal to or smaller than 0.02 mm.

3. The optical lens of claim 1, wherein the stepped difference is equal to or greater than 5 µm and equal to or smaller than 20 µm.

4. The optical lens of claim 1, wherein the intermediate structure includes a circumferential wall, an included angle is defined between the circumferential wall and the axial direction of the optical lens, and the included angle is equal to or greater than 1 degree and equal to or smaller than 20 degrees.

5. The optical lens of claim 1, wherein a reference plane is defined as to be perpendicular to the axial direction of the optical lens, the reference plane and a tangent direction which is tangent to a peripheral edge of the arcuate surface define a first included angle therebetween, the reference plane and a tangent direction which is tangent to a peripheral edge of the spiral surface define a second included angle therebetween, and the first included angle is greater than the second included angle.

6. The optical lens of claim 5, wherein the first included angle is equal to or greater than 17.0 degrees, and the second included angle is equal to or greater than 0.70 degrees.

7. A mold for manufacturing the optical lens of claim 1, including: a spiral surface spiraling around an axial direction of the mold and an intermediate structure around which the spiral surface spirals, the intermediate structure of the mold extends axially relative to a side of the spiral surface of the mold, two ends of the spiral surface of the mold defining a stepped difference, profiles of the spiral surface, intermediate structure and stepped difference of the mold and profiles of the spiral surface, intermediate structure and stepped difference of the optical lens are correspondingly complementary, respectively.

8. The mold of claim 7, wherein the intermediate structure of the mold is a projection, an end face of the projection has a diametric dimension equal to or greater than 0.001 mm and equal to or smaller than 0.02 mm.

9. The mold of claim 7, wherein an arcuate surface is connected between the intermediate structure of the mold and the spiral surface of the mold, and the arcuate surface of the mold has an arc radius equal to or greater than 0.001 mm and equal to or smaller than 0.02 mm.

10. The mold of claim 7, wherein the stepped difference of the mold is equal to or greater than 5 µm and equal to or smaller than 20 µm.

11. The mold of claim 7, wherein the intermediate structure of the mold includes a circumferential wall, an included angle is defined between the circumferential wall of the mold and the axial direction of the mold and is equal to or greater than 1 degree and equal to or smaller than 20 degrees.

12. The mold of claim 9, wherein a base plane is defined as to be perpendicular to the axial direction of the mold, the base plane and a tangent direction which is tangent to a peripheral edge of the arcuate surface of the mold define a first included angle therebetween, the base plane and a tangent direction which is tangent to a peripheral edge of the spiral surface of the mold define a second included angle, and the first included angle of the mold is greater than the second included angle of the mold.

13. The mold of claim 12, wherein the first included angle of the mold is equal to or greater than 17.0 degrees, and the second included angle of the mold is equal to or greater than 0.70 degrees.

14. A method for manufacturing the mold of claim 7, including steps of:
providing a base, the base including a processing surface;
processing the processing surface to form the spiral surface, the intermediate structure and the stepped difference of the mold.

15. The method of claim 14, wherein a cutter is used to process the processing surface to form the spiral surface, intermediate structure and stepped difference of the mold, and relatively, cutting paths of the cutter on the base is spirally around an axial direction of the base.

16. The method of claim 15, wherein the cutter processes the processing surface from outside to inside along the cutting paths spirally around the axial direction of the base.

17. The method of claim 15, wherein the cutter has two opposite cutting edges having different arced angles, and the processing surface is processed by the cutter in a manner that one of the two opposite cutting edges having a relatively smaller arced angle faces radially inward.

18. The method of claim 17, wherein one of the two opposite cutting edges has an arc radius equal to or smaller than 1 µm, and the other of the two opposite cutting edges has an arc radius equal to or smaller than 5 µm.

19. The method of claim 15, wherein each of the cutting paths spirally extends from high to low relative to the processing surface, and extends upwardly at the stepped difference of the mold from low to high relative to the processing surface.

* * * * *